(12) United States Patent
Yan et al.

(10) Patent No.: US 9,507,118 B2
(45) Date of Patent: Nov. 29, 2016

(54) LENS MODULE

(71) Applicants: Junjie Yan, Shenzhen (CN); Chuandong Wei, Shenzhen (CN); Chunhuan Fang, Shenzhen (CN); Lei Zhang, Shenzhen (CN); Liangwei Wan, Shenzhen (CN)

(72) Inventors: Junjie Yan, Shenzhen (CN); Chuandong Wei, Shenzhen (CN); Chunhuan Fang, Shenzhen (CN); Lei Zhang, Shenzhen (CN); Liangwei Wan, Shenzhen (CN)

(73) Assignee: AAC Acoustic Technologies (Shenzhen) Co. Ltd., Shenzhen (CN)

( * ) Notice: Subject to any disclaimer, the term of this patent is extended or adjusted under 35 U.S.C. 154(b) by 161 days.

(21) Appl. No.: 14/643,137

(22) Filed: Mar. 10, 2015

(65) Prior Publication Data

US 2015/0260940 A1 Sep. 17, 2015

(30) Foreign Application Priority Data

Mar. 14, 2014 (CN) .................... 2014 2 0123720 U

(51) Int. Cl.
*G02B 9/04* (2006.01)
*G02B 7/02* (2006.01)
*G02B 7/00* (2006.01)

(52) U.S. Cl.
CPC ............... *G02B 7/021* (2013.01); *G02B 7/003* (2013.01); *G02B 7/022* (2013.01)

(58) Field of Classification Search
CPC ....... G02B 7/003; G02B 7/021; G02B 7/022
USPC .......... 359/811, 819, 826, 823, 701
See application file for complete search history.

(56) References Cited

U.S. PATENT DOCUMENTS

2009/0015945 A1* 1/2009 Chen .................. G02B 7/021
359/819

* cited by examiner

*Primary Examiner* — Scott J Sugarman
*Assistant Examiner* — Vipin Patel
(74) *Attorney, Agent, or Firm* — Na Xu; IPro, PLLC

(57) ABSTRACT

Disclosed is lens module. The lens module includes a barrel and a lens group disposed in the barrel. The lens group includes a first lens element connecting with the barrel and a second lens element connecting with the first lens element. The first lens element connecting with the barrel makes the lens module have a first matching precision. The first matching precision makes the barrel and the lens group be concentric. The first lens element has a first arc surface and the second lens element has a second arc surface engaging with the first arc surface which makes the lens module have a second matching precision. The second matching precision makes the first lens element and the second lens element be concentric.

10 Claims, 4 Drawing Sheets

LENS MODULE

FIELD OF THE INVENTION

The disclosure described herein relates generally to a lens module.

DESCRIPTION OF RELATED ART

With the intelligence development of electronic devices, the electronic devices, like cameras, laptops, mobile phones, are all equipped with lens modules. People not only require the electronic devices have various functions, but also require a lens module capable of capturing image with high performance.

Related lens module usually comprises a barrel having a light hole and a lens group having at least two lens elements. Ideally, the optical axis of the lens group and a line passing through the geometrical center of the light hole should coincide with each other, that is, the barrel and the lens group should be concentric. Furthermore, the connection between the lens elements should also be very stable. However, due to the high sensitivity to the eccentricity, the concentricity and stability of the lens elements are hard to be guaranteed.

Therefore, an improved lens module is provided in the present disclosure to solve the problem mentioned above.

Figure 1:
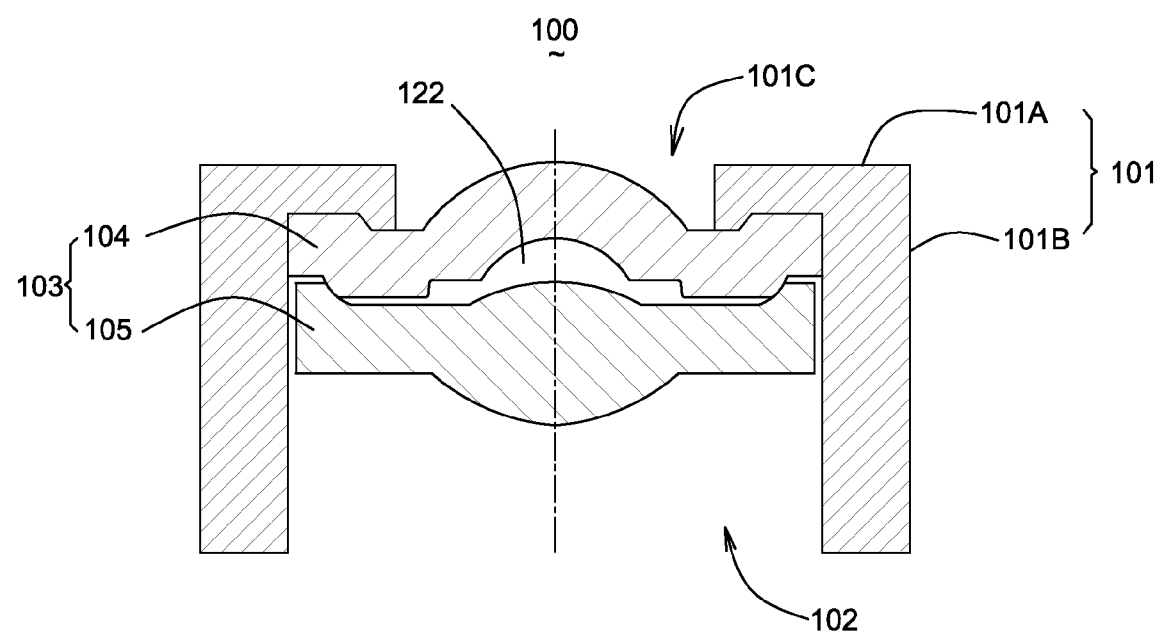
FIG. 1 illustrates a cross-sectional view of a lens module according to a first exemplary embodiment of the present disclosure.

Many aspects of the embodiments can be better understood with reference to the drawings mentioned above. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Reference will now be made to describe the exemplary embodiments of the present invention in detail.

Referring to FIG. 1, a lens module 100 comprises a barrel 101, and a lens group 103 disposed in and connecting with the barrel 101.

Figure 2:
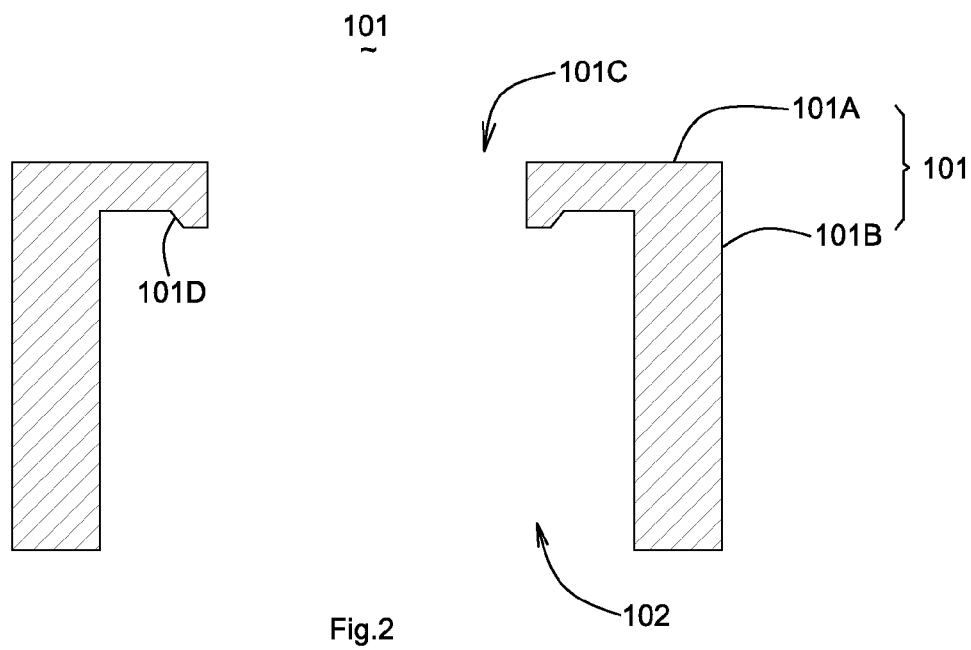
FIG. 2 illustrates a cross-sectional view of a barrel of the lens module as shown in FIG. 1.

The barrel 101 has a first sidewall 101A, a light hole 101C formed in the center of the first sidewall 101A, and a second sidewall 101B extending from the first sidewall 101A along a direction perpendicular to the first sidewall 101A. The first sidewall 101A and the second sidewall 101B unite to form a receiving room 102, and the light hole 101C communicates with the receiving room 102. Referring to FIG. 2, the second sidewall 101A has a first inclined surface 101D.

The lens group 103 comprises a first lens element 104 and a second lens element 105 connecting with the first lens element 104. The first lens element 104 has a first optical axis 104D and the second lens element 105 has a second optical axis 105D.

Figure 3:
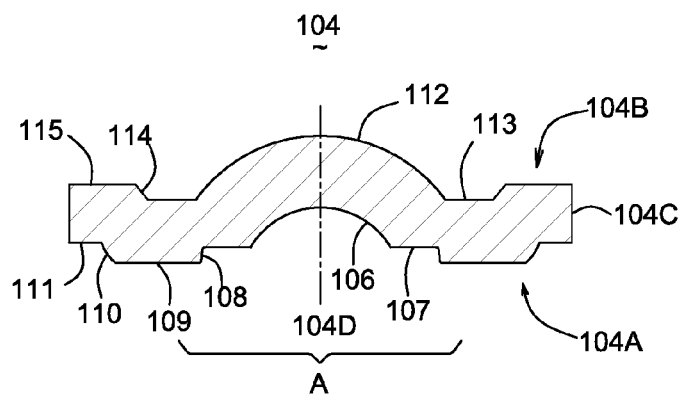
FIG. 3 is a cross-sectional view of a first lens element of the lens module as shown in FIG. 1.

Referring to FIG. 3, the first lens element 104 has a first surface 104A opposite to the second lens element 105, a second surface 104B opposite to the first surface 104A and a side surface 104C connecting with the first surface 104A and the second surface 104B. The side surface 104C engages with the first engaging surface 101D. The first surface 104A has a first portion A arranged at the middle of the first surface 104A and centered about the first optical axis 104D, a first arc surface 110 extending from the periphery of the first portion A and a second portion 111 extending from the first arc surface 110 and away from the first portion A. The first portion A comprises a first optical surface 106 arranged at the middle of the first surface 104A and centered about the first optical axis 104D, a first extending surface 107 extending from the periphery of the first optical surface 106 and away from the first optical axis 104D, a connecting surface 108 bended along from and extending from the periphery of the first extending surface 107, and a second extending surface 109 extending from the periphery of the connecting surface 108 and away from the first optical axis 104D. The second surface 104B has a second optical surface 112 at the center of the second surface 104B and centered about the first optical axis 104D, a third extending surface 113 extending from the periphery of the second optical surface 112 and engaging with the surface of the first sidewall 101A facing the receiving room 102, a second inclined surface 114 engaging with the first inclined surface 101D and a fourth extending surface 115 engaging with the surface of the first sidewall 101A facing the receiving room 102. The third and fourth extending surfaces 113, 115 engaging with the first sidewall 101A, the second inclined surface 114 engaging with the first inclined surface 101D and the side surface 104C engaging with the second sidewall 101B make the lens module 100 have a first matching precision. The first matching precision is used for ensuring the barrel 101 is coaxial with the first lens element 104.

Figure 4:
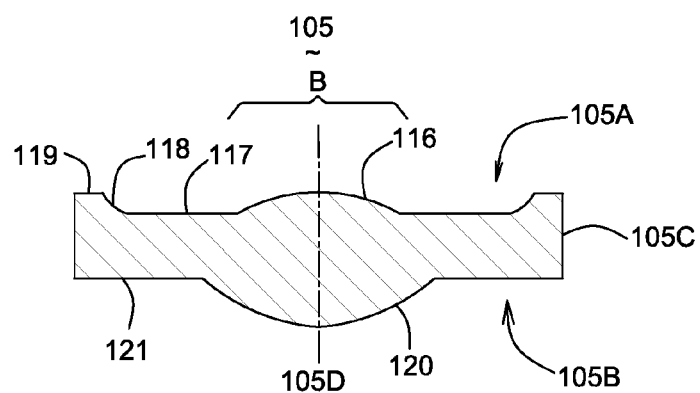
FIG. 4 is a cross-sectional view of a second lens element of the lens module as shown in FIG. 1.

Referring to FIG. 4, the second lens element 105 has an upper surface 105A near the first lens element 104, a lower surface 105B opposite to the upper surface 105A and a periphery surface 105C connecting with the upper surface 105A and the lower surface 105B. The periphery surface 105C keeps a predetermined distance from the second sidewall 101B. The upper surface 105A has a third portion B arranged at the middle of the upper surface 105A and centered about the second optical axis 105D, a second arc surface 118 extending from the periphery of the third portion B and engaging with the first arc surface 110, and a fourth portion 119 extending from the periphery of the second arc surface 116 and away from the third portion B. The fourth portion 119 keeps a distance from the second portion 111. The third portion B comprises a third optical surface 116 arranged at the middle of the upper surface 105A and centered about the second optical axis 105D, and a first bearing surface 117 extending from the periphery of the third optical surface 116. The second arc surface 118 engages with the first arc surface 110 for forming a second matching precision of the lens module 100. The lower surface 105B has a fourth optical surface 120 at the center of the lower surface 105B and centered about the second optical axis 105D, and a second bearing surface 121 extending from the periphery of the fourth optical surface 120. The second matching precision is used for ensuring the first lens element 104 is coaxial with the second lens element 105, that is, the first optical axis 104D is coincide with the second optical axis 105D.

In the first embodiment, the first arc surface 110 and the second arc surface 118 are configured to be a part of a circle. Specifically, the first arc surface 110 is a convex arc surface, and the second arc surface 118 is correspondingly a concave arc surface. Furthermore, the lens module 100 further has an air interval 122 formed by the first portion A and the third portion B. The air interval 122 is used for receiving a light filter. The thickness of the light filter should be smaller than that of the air interval 122, thereby the thickness tolerance of the light filter will not impact the matching precision between the first lens element 104 and the second lens element 105. Besides, the distance between the first portion A and the third portion B, and the distance between the second portion 111 and the fourth portion 119 ensure that the concentricity of the lens group 103 is determined solely by the engaging structure between the first arc surface 110 and the second arc surface 119, that is, the axiality tolerance of the barrel 101 does not impact the concentricity of the lens group 103.

The engaging structure between the first lens element 104 and the second lens element 105 ensures the first optical axis 104D and the second optical axis 105D are coincide with each other, and the engaging structures between the first lens element 104 and the barrel 101 ensure the center of the light hole 104C is located on the common optical axis of the first lens element 104 and the second lens element 105, thereby the concentricity between the barrel 101 and the lens group 103 is ensured.

Figure 5:
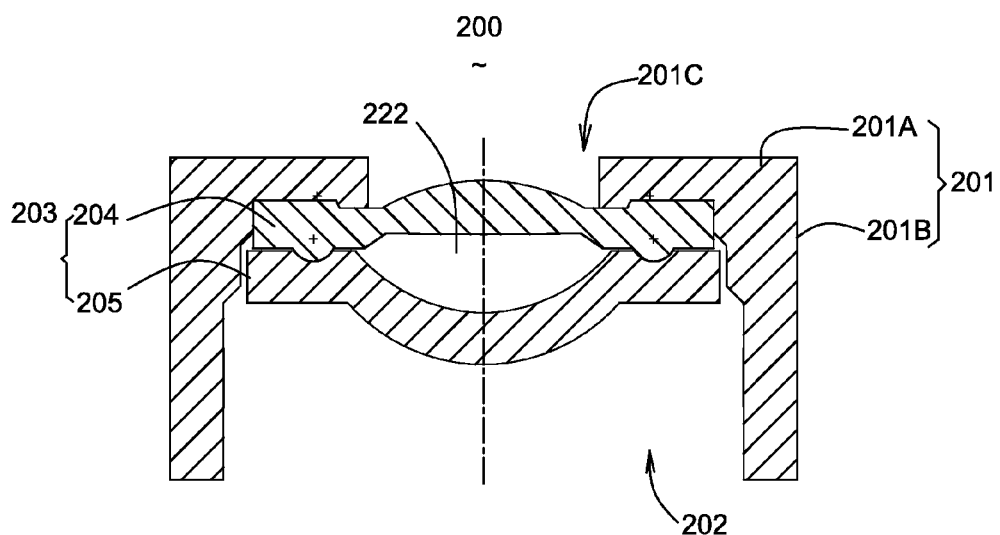
FIG. 5 is a cross-sectional view of a lens module according to a second exemplary embodiment of the present disclosure.

FIG. 5 illustrates the cross-sectional view of the third embodiment of the lens module according with the present disclosure. A lens module 200 comprises a barrel 201 and a lens group 203 disposed in and connecting with the barrel 201.

Figure 6:
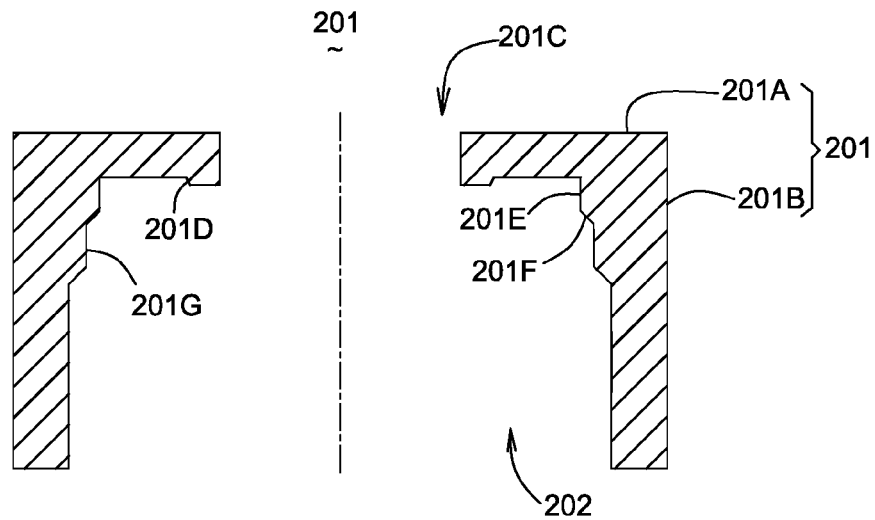
FIG. 6 is a cross-sectional view of a barrel of the lens module as shown in FIG. 5.

The barrel 201 has a first sidewall 201A, a light hole 201C at the center of the first sidewall 201A, and a second sidewall 201B extending from the first sidewall along a direction perpendicular to the first sidewall 201A. The first sidewall 201A and the second sidewall 201B unite to form a receiving room 202, and the light hole 201C communicates with the receiving room 202. Referring to FIG. 6, the first sidewall 201A has a first inclined surface 201D. The second sidewall 201B has a first engaging surface 201E, an extending surface 201F extending from the first engaging surface 201E and bended along a direction far away from the line crossing the center of the light hole 201C, and a second engaging surface 201G bended along and extending from the extending surface 201F. By virtue of the extending surface 201F, an inner diameter of the first engaging surface 201E is smaller than an inner diameter of the second engaging surface 201G. In another word, the second engaging surface 201G is farther from an optic axis of the barrel 201 than the first engaging surface 201E.

The lens group 203 comprises a first lens element 204 and a second lens element 205 connecting with the first lens element 204. The first lens element 204 has a first optical axis 204D and the second lens element 205 has a second optical axis 205D.

Figure 7:
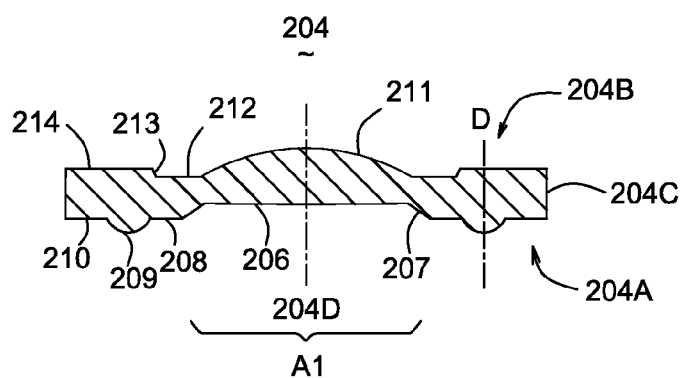
FIG. 7 is a cross-sectional view of a first lens element of the lens module as shown in FIG. 5.

Referring to FIG. 7, the first lens element 204 has a first surface 204A opposite to the second lens element 205, a second surface 204B opposite to the first surface 204A and a side surface 204C connecting with the first surface 204A and the second surface 204B. The side surface 204C engages with the first engaging surface 201E. The first surface 204A has a first portion A1 arranged at the middle of the first surface 204A, a first arc surface 209 extending from the periphery of the first portion A1 and a second portion 210 extending from the periphery of the first arc surface 209. The first portion A1 comprises a first optical surface 206 arranged at the middle of the first surface 204A and centered about the first optical axis 204D, a transition surface 207 bended from and extending from the periphery of the first optical surface 206, and a first extending surface 208 extending from the periphery of the transition surface 207. The second surface 204B has a second optical surface 211 arranged at the middle of the second surface 204B and centered about the first optical axis 204D, a second extending surface 212 extending from the periphery of the second optical surface 211 and engaging with the first sidewall 201A, an second inclined surface 213 engaging with the first inclined surface 201D and a third extending surface 214 engaging with the first sidewall 201A. The second and third extending surfaces 212, 214 engaging with the first sidewall 201A, the second inclined surface 213 engaging with the first inclined surface 201D and the side surface 204C engaging with the first engaging surface 201E make the lens module 200 have a first matching precision. The first matching precision is used for ensuring the barrel 201 is coaxial with the first lens element 204.

Figure 8:
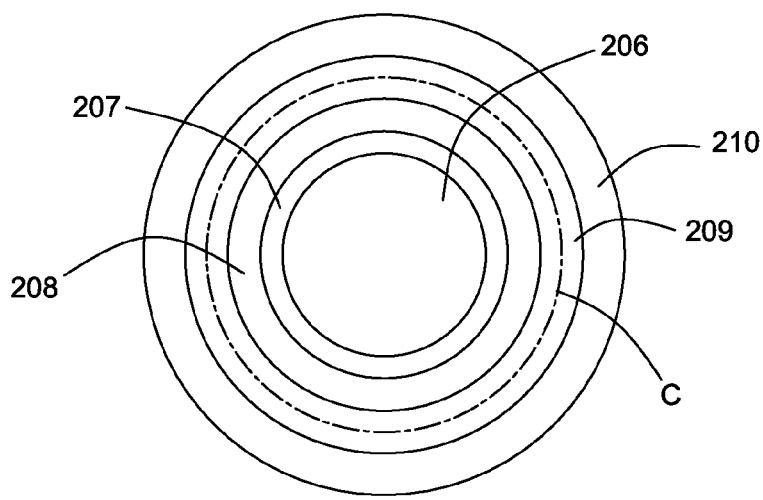
FIG. 8 is a bottom view of the first lens element of the lens module as shown in FIG. 7.

Referring to FIG. 8, the second lens element 205 has an upper surface 205A near the first lens element 204, a lower surface 205B opposite to the upper surface 205A and a periphery surface 205C connecting with the upper surface 205A and the lower surface 205B. The periphery surface 205C keeps a distance from the second engaging surface 201G. The upper surface 205A has a third portion B1 arranged at the middle of the upper surface 205A, a second arc surface 217 extending from the periphery of the third portion B1 and engaging with the first arc surface 209, and a fourth portion 218 extending from the periphery of the second arc surface 217. The fourth portion 218 keeps a distance from the second portion 210. The third portion B1 comprises a third optical surface 215 arranged at the middle of the upper surface 205A and centered about the second optical axis 205D, and a first bearing surface 216 extending from the periphery of the third optical surface 215. The second arc surface 217 engages with the first arc surface 209 for forming a second matching precision of the lens module 200. The lower surface 205B has a fourth optical surface 219 arranged at the middle of the lower surface 205B and centered about the second optical axis 205D, and a second bearing surface 220 extending from the periphery of the fourth optical surface 219. The second matching precision is used for ensuring the first lens element 204 is coaxial with the second lens element 205, that is, the first optical axis 204D is coincide with the second optical axis 205D.

Figure 9:
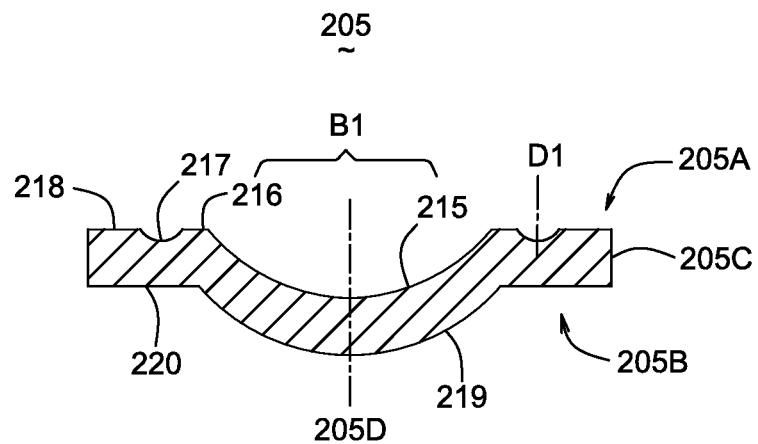
FIG. 9 is a cross-sectional view of a second lens element of the lens module as shown in FIG. 5.
Figure 10:
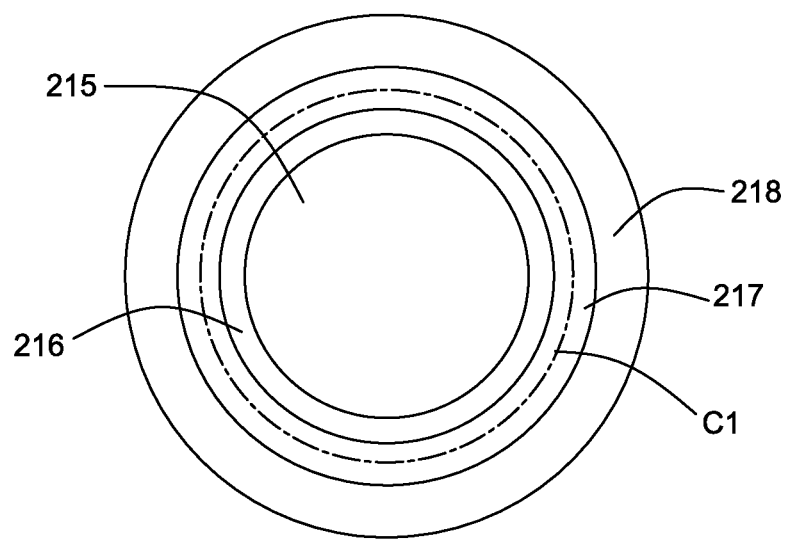
FIG. 10 is a vertical view of the second lens element of the lens module as shown in FIG. 9.

In this embodiment, the first arc surface 210 has a continuous line C that furthest from the second surface 204B. Referring to FIG. 8, the continuous line C is formed by the lowest points of the first arc surface 209, and the continuous line C is a closed circle. Referring back to FIG. 7, take the cross-sectional view of the first arc surface 209 on the right for example, the cross-sectional view of the first arc surface 209 on the right is symmetrical about line D. Referring to FIG. 10, the second arc surface 217 has a continuous line C1 that furthest from the upper surface 205A. The continuous line C1 is formed by the lowest points on the second arc surface 217, and the continuous line C1 is a circle. Referring back to FIG. 9, take the cross-sectional view of the second arc surface 217 on the right for example, the cross-sectional view of the second arc surface 217 on the right is symmetrical about the line D1. Optionally, the first arc surface 209 and the second arc surface 217 could be a discontinuous arc surface.

Furthermore, the lens module 200 further has an air interval 221 formed by the first portion A1 and the third portion B1. The air interval 221 is used for receiving a light filter. The thickness of the light filter should be smaller than that of the air interval 221, thereby, the thickness tolerance of the light filter will not impact the matching precision between the first lens element 204 and the second lens element 205. Besides, the distance between the first portion A1 and the third portion B1, and the distance between the second portion 210 and the fourth portion 218 ensure the concentricity of the lens group 203 is only decided by the engaging structure between the first arc surface 209 and the second arc surface 217, that is, the axiality tolerance of the barrel 201 does not impact the concentricity of the lens group 203.

The engaging structure between the first lens element 204 and the second lens element 205 ensures the first optical axis 204D and the second optical axis 205D are coincide with each other, and the engaging structures between the first element 204 and the barrel 201 ensure the center of the light hole 204C is located on the common optical axis of the first lens element 204 and the second lens element 205, thereby the concentricity between the barrel 201 and the lens group 203 is ensured.

While the present disclosure has been described with reference to the specific embodiment, the description of the disclosure is illustrative and is not to be construed as limiting the disclosure. Various of modifications to the present disclosure can be made to the exemplary embodiment by those skilled in the art without departing from the true spirit and scope of the disclosure as defined by the appended claims.

What is claimed is:

1. A lens module, comprising:
  a barrel having a first sidewall having a first inclined surface, a light hole formed in the center of the first sidewall, a second sidewall extending from the first sidewall and a receiving room formed by the first sidewall and the second sidewall;
  a first lens element disposed in the receiving room and connecting with the barrel for making the lens module have a first matching precision, the first lens having a first optical axis, a first surface, a second surface opposite to the first surface and a side surface connecting with the first surface and the second surface, the side surface engaging with the second sidewall, the first surface having a first portion arranged at the middle of the first surface, a first arc surface extending from a periphery of the first portion and a second portion extending from a periphery of the first arc surface; the second surface having a second inclined surface engaging with the first inclined surface;
  a second lens element disposed in the receiving room and connecting with the first lens element for making the lens module have a second matching precision, the second lens element having a second optical axis, an upper surface near the first lens element, a lower surface opposite to the upper surface and a periphery surface connecting with the upper surface and the lower surface, the periphery surface keeping a distance from the second sidewall, the upper surface having a third portion arranged at the middle of the upper surface and centered about the second optical axis, a second arc surface extending from the periphery of the third portion and engaging with the first arc surface, and a fourth portion extending from a periphery of the second arc surface;
  the first portion keeping a predetermined distance from the third portion and the second portion keeping a predetermined distance from the fourth portion, the second matching precision making the first optical axis and the second optical axis coincide with each other and the first matching precision making the center of the light hole be located on the optical axis of the first lens element and the second lens element.

2. The lens module as described in claim 1, wherein the first portion comprises a first optical surface arranged at the middle of the first surface and centered about the first optical axis, a first extending surface extending from a periphery of the first optical surface, a connecting surface extending from a periphery of the first extending surface, and a second extending surface extending from a periphery of the connecting surface.

3. The lens module as described in claim 2, wherein, the second surface has a second optical surface arranged at the middle of the second surface and centered about the first optical axis, and a third extending surface for connecting the second optical surface and the second inclined surface extending from a periphery of the second optical surface, and a fourth extending surface extending from a periphery of the second inclined surface, the third extending surface and the fourth extending surface both engaging with the first sidewall.

4. The lens module as described in claim 3, wherein the third portion comprising a third optical surface arranged at the middle of the upper surface and centered about the second optical axis, and a first bearing surface extending from the third optical surface.

5. The lens module as described in claim 1, wherein the first portion comprises a first optical surface arranged at the middle of the first surface and centered about the optical axis, a transition surface extending from a periphery of the first optical surface, and a first extending surface extending from a periphery of the first optical surface.

6. The lens module as described in claim 5, wherein the second surface comprises a second optical surface arranged at the middle of the second surface and centered about the first optical axis, and a second extending surface for connecting the second optical surface and the second inclined surface extending from a periphery of the second optical surface, and a third extending surface extending from a periphery of the second inclined surface, the second extending surface and the third extending surface both engaging with the first sidewall.

7. The lens module as described in claim 6, wherein the third portion comprises a third optical surface arranged at the middle of the upper surface and centered about the second optical axis, and a first bearing surface extending from a periphery of the third optical surface.

8. The lens module as described in claim 5, wherein the first arc surface has a continuous line that furthest from the second surface and the continuous line is formed by the lowest points of the first arc surface.

9. The lens module as described in claim 8, wherein the second arc surface has a continuous line that furthest from the upper surface and the continuous line is formed by the lowest points on the second arc surface.

10. The lens module as described in claim 1 further comprising a light filter disposed between the first portion and the third portion.

* * * * *